United States Patent
Horiuchi et al.

(10) Patent No.: US 8,713,552 B2
(45) Date of Patent: Apr. 29, 2014

(54) AVOIDING CONFLICT IN UPDATE IN DISTRIBUTED ENVIRONMENT EMPLOYING MULTIPLE CLIENTS

(75) Inventors: Yoshio Horiuchi, Yamato (JP); Kenji Uchida, Yamato (JP); Masaki Wakao, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 12/749,694

(22) Filed: Mar. 30, 2010

(65) Prior Publication Data

US 2010/0251206 A1    Sep. 30, 2010

(30) Foreign Application Priority Data

Mar. 30, 2009   (JP) .................................. 2009-083614

(51) Int. Cl.
*G06F 9/45* (2006.01)
*G06F 9/44* (2006.01)

(52) U.S. Cl.
USPC .......................................... 717/168; 717/103

(58) Field of Classification Search
CPC ............... G06F 8/20; G06F 8/71; G06F 8/10; G06F 8/65; G06F 8/67; G06F 8/68
USPC ........................................................ 717/103
See application file for complete search history.

(56) References Cited

U.S. PATENT DOCUMENTS

| | | | | |
|---|---|---|---|---|
| 7,454,744 | B2 * | 11/2008 | Bhogal et al. | 717/122 |
| 2005/0010916 | A1 * | 1/2005 | Hagen et al. | 717/170 |
| 2006/0288056 | A1 * | 12/2006 | Yamakawa et al. | 707/203 |
| 2008/0140732 | A1 * | 6/2008 | Wilson et al. | 707/201 |
| 2009/0129597 | A1 * | 5/2009 | Zimmer et al. | 380/277 |

FOREIGN PATENT DOCUMENTS

| | | | |
|---|---|---|---|
| JP | 06332676 | A | 12/1994 |
| JP | 07319674 | A | 12/1995 |
| JP | 11306173 | A | 11/1999 |
| JP | 2002366674 | A | 12/2002 |
| JP | 2007172223 | A | 7/2007 |
| JP | 2007272443 | A | 10/2007 |
| JP | 2009048442 | A | 3/2009 |
| JP | 2009053767 | A | 3/2009 |

* cited by examiner

*Primary Examiner* — Li B Zhen
*Assistant Examiner* — Hui-Wen Lin
(74) *Attorney, Agent, or Firm* — Patents on Demand P.A.; Brian K. Buchheit; Scott M. Garrett

(57) ABSTRACT

A client transmits, to a server, an instruction to copy a certain file for update, and receives the copied file. Upon update of the received file, the client generates update information on the update of the received file, and transmits the generated update information to the server. The server extracts a file containing a part related to the received update information, and judges whether or not the extracted file has been copied and then transmitted to a different client. If judging that the extracted file has been copied and transmitted to the different client, the server transmits warning information to the different client to which the extracted file has been transmitted, the warning information indicating that the file is updated in the client other than the different client.

22 Claims, 13 Drawing Sheets

FIG. 6

AVOIDING CONFLICT IN UPDATE IN DISTRIBUTED ENVIRONMENT EMPLOYING MULTIPLE CLIENTS

CROSS-REFERENCE TO RELATED APPLICATIONS

This application claims the benefit of Japanese Patent Application No. 2009-83614 filed 30 Mar. 2009 and entitled "SYSTEM, METHOD, SERVER AND COMPUTER PROGRAM FOR AVOIDING CONFLICT IN UPDATE IN DISTRIBUTED ENVIRONMENT EMPLOYING MULTIPLE CLIENTS", which is assigned to the assignee of the present application, and the teachings of which are hereby incorporated by reference in their entirety.

BACKGROUND

The present disclosure relates to a system, a method, a server and a server/client executable computer program which are capable of avoiding conflicts in an update in a distributed development environment where files are updated by multiple clients and the updated files are collected to the server.

It is often the case in large-scale system development that many developers engage in development efforts in a distributed environment. In system development in a distributed environment, multiple clients develop a program while a server performs management of the developed program source code, build management of a target application, bug management and the like. Source code files edited by the clients are regularly collected to the server, and the artifact built from the source code files in the same form as the target application is tested.

Development of a larger-scale system is more likely to encounter conflicts in which multiple clients update the same part of the same program file, for example. Moreover, an unexpected error may occur at the time of a build due to an unexpected influence of editing by a client, for example. In this way, for a larger-scale system, there is a tendency to have more difficulty in efficiently advancing the entire system development.

Attempts have been made to perform system development in a distributed environment as efficiently as possible. For example, one known system uses an agent process to collect a number of source code lines every time a program is updated by a client. Using this approach, however, only information on the number of source code lines or the like for estimating the size of a program is collected. Thus, detection of whether or not a conflict is occurring in an update of the distributed environment is not possible or contemplated.

Another known approach uses a repository system that acquires design resources referring to a design recourse to be stored. The acquired design resources are then stored in a storage medium. In another approach, a development support system is provided that stores information pieces on updates performed on a program. Relevant information pieces on updates are transmitted to developers when requested. Both of these approaches uses a server to collect, manage, and store information on an update or related development chance. Thus, using either of these approaches, it is not possible to manage an update of a program until suitable information is stored in the server. Thus, situations occurring before a transfer of this information from a client to the server remain problematic and unresolved by either approach.

Further, many aspects of a distributed environment remain problematic to any of the above approaches. For example, in a server managed system, a developer's computer attempts to acquire the most-up-to-date source code from a server. In some cases, the client may subsequently run a test of the source code before utilizing it. A client computer is unable, however, to acquire source code being edited by a third party, which is a common situation in a distributed development environment. Thus, the text may be run on source code with is not the most current. Thus, versioning problems resulting from concurrent access to a set of development products exist.

A check-in/check-out version control system (or document management system) can be used to prevent or minimize versioning problems. That is, a lock can be imposed on a program file before it is updated to disallow a third party from editing the file. When this occurs, other developers (plus the third party) will not be able to edit the locked program file, until the lock is released. This can cause a wait state or bottle-neck, which hampers efficiencies of a distributed development environment. This is especially the case, when developers inadvertently forget to release a program lock, or to check a "checked out" file back in to a document management system.

Similar (and more troubling) problem can arise in updating files in a distributed environment due to inter file dependencies. Specifically, when an update to be performed is influenced by an update of a file by a third party (or other developer), update issues emerge. For example, if a document in a structured language (such as HTML or XML, is created in a distributed environment, conflict may occur in the document editing. This type of problem is not resolved by use of a document management system, as a change in one file produces a set of side-effects, which causes other files to be negatively affected.

BRIEF SUMMARY

The disclosure has been made in view of the above-described circumstances, and is aimed to provide a system, a method, a server, and a computer program which enable, even in a large-scale update in a distributed environment, a person performing the update to accurately detect whether or not a conflict may occur in the update.

In one embodiment, if a file is updated by a client (e.g., if the program file is updated on a memory of the client; if an updated program file is stored in a work directory of the client; or the like) update information on the update is generated. The generated update information is collected to a server. Thereby, the server can know which part of which program file is updated. If a program file including a part related to the received update information is being updated by a different client, warning information indicating that the related program file is being updated by another client is transmitted to the different client. With this configuration, each person updating the same part of source code using a client and each person updating, by using a client, a program file which may be affected by the updated part can appropriately plan a test procedure to prevent unnecessary tests. Consequently, waste in program development can be minimized.

Numerous aspects of the disclosure are contemplated which can be optionally implemented in various embodiments of the disclosure. Not all aspects are present in every embodiment, and described aspects are expected to be tailored and adapted for specific implementations. Thus, the various aspects and details expressed herein, when taken as a whole, permit one of ordinary skill in the art to grasp the scope of the present disclosure, which is defined more succinctly by the claims. It should be understood that nothing in this brief summary or detailed description is meant to be construed in a manner that limits the scope of the claimed content expressed herein.

According to one aspect of the disclosure, a set of files can be collected and stored at a server communicatively linked to a set of clients. Each of the files can be updated by any of the clients at any time. The files can be stored in a tangible storage medium communicatively linked to the server. Update information can be received on an update of a copied one of the files from one of the clients. The update information can be generated when the client updates the copied file. A file containing a part related to the received update information can be extracted. A judging can occur as to whether or not the extracted file has been copied and then transmitted to another client. When the extracted file is judged to have been copied and transmitted to the another client, warning information can be transmitted to the another client to which the file has been transmitted. The warning information can indicate that the file is updated in the one of the clients.

According to one aspect of the disclosure, an instruction to copy a certain file for update can be transmitted to a server from one of a set of clients, each having an ability to update files stored by the server. Receiving at the client, the copied file. Upon update of the received file, generating at the client update information on the update of the received file. Transmitting, to the server from the one client, the generated update information.

According to one aspect of the disclosure, a server can exist that is connected to a set of clients so as to be capable of data communication with the clients. The server can be operable to collect and store a set of files updated in some of the clients. The server can comprise hardware operable to execute computer program instructions. The server can include a first receiving unit, an extracting unit, a copy judging unit, and a second information transmitting unit, which can each be computer programs stored on a tangible storage medium. The first receiving unit can receive update information on update of a copied one of the files from one of the clients. The update information can be generated if the one of the clients updates the copied file. The extracting unit can extract a file containing a part related to the received update information. The copy judging unit can judge whether or not the extracted file has been copied and then transmitted to another client. The second information transmitting unit, if the copy judging unit judges that the extracted file has been copied and transmitted to the another client, can transmit warning information to the another client to which the file has been transmitted, the warning information indicating that the file is updated in the one of the clients.

According to one aspect of the disclosure, a client can exist, which is one of a set of clients communicatively linked to a server. The server can be operable to collect and store a set of files updated in some of the clients, including the client. The client can include hardware operable to execute computer program instructions. The client can include an instruction transmitting unit, a file receiving unit, a generating unit, and a first information transmitting unit, each of which are computer programs stored on a tangible storage medium. The instruction transmitting unit can transmit, to the server, an instruction to copy a certain file for update. The file receiving unit can receive the copied file. The generating unit can, upon update of the received file, generate update information on the update of the received file. The first information transmitting unit can transmit the generated update information to the server.

It should be noted that various aspects of the disclosure can be implemented as a program for controlling computing equipment to implement the functions described herein, or a program for enabling computing equipment to perform processes corresponding to the steps disclosed herein. Computing equipment can include, for example, a processor, a memory, input/output components, network transceivers, and the like interconnected via a bus and ports. Programmatic instructions of the program (which can be a computer program product that includes software and/or firmware), can be executed and/or interpreted by one or more processors of the computing equipment. The program may be provided by storing the program in a magnetic disk, an optical disk, a semiconductor memory, and any other recording tangible, physical, and non-transitory storage medium. The described program can be a single program or can be implemented as multiple subprograms, each of which interact within a single computing device or interact in a distributed fashion across a network space.

BRIEF DESCRIPTION OF THE SEVERAL VIEWS OF THE DRAWINGS

FIGS. 6A, 6B and 6C are each an illustration of an editor screen.

DETAILED DESCRIPTION

Figure 1:
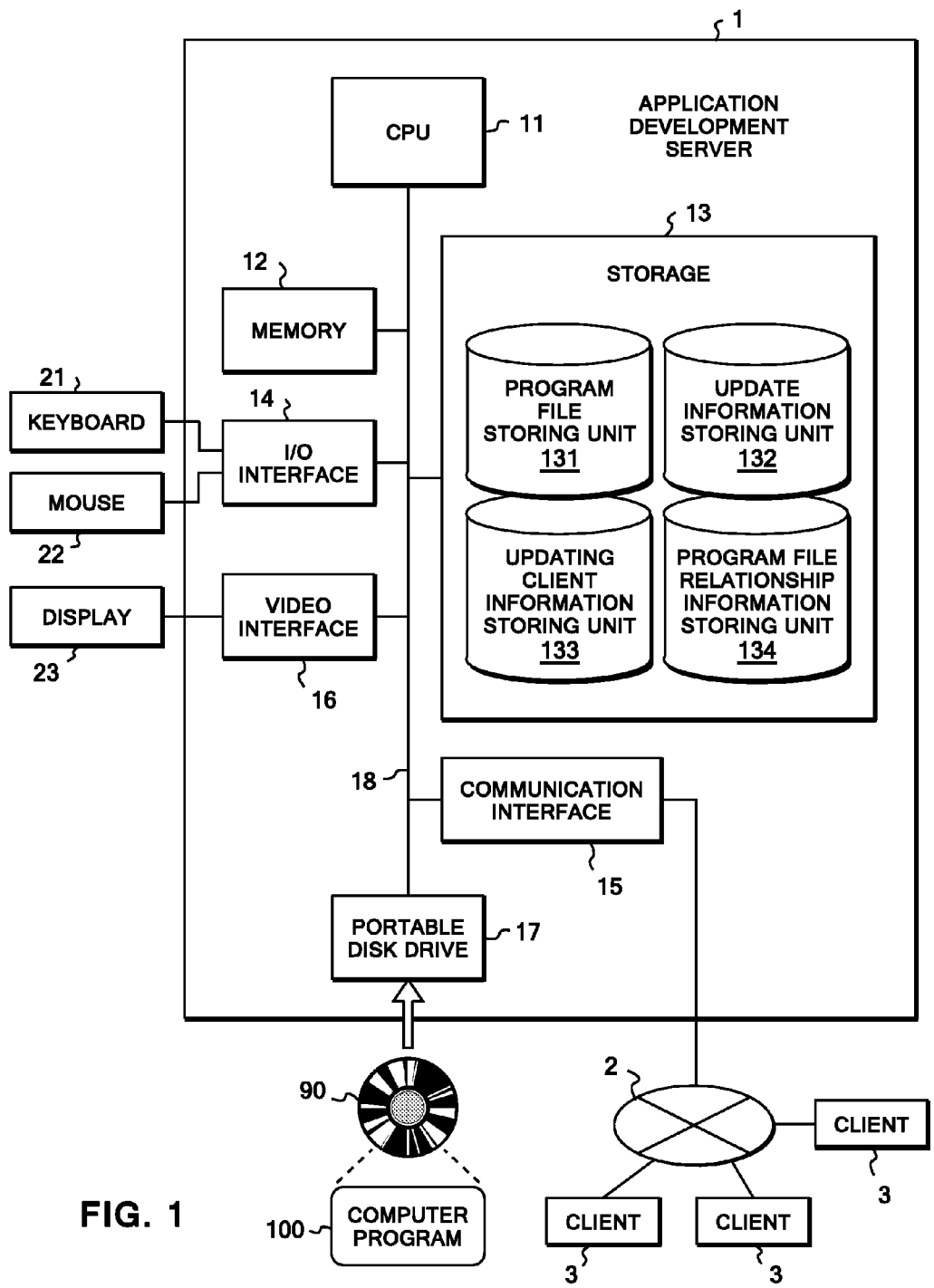
FIG. 1 is a block diagram showing a configuration example of an application development system according to Embodiment 1 of the disclosure.

With reference to the drawings, description will be given below of systems according to embodiments which enable a person performing an update to accurately detect whether or not any conflict is occurring in the update. Needless to say, the following embodiments are not intended to limit the invention described in the scope of claims, and not all combinations of features described in each of the embodiments are necessary as solving means.

In addition, the disclosure can be implemented in many different modes, and is not intended to be understood only as limited modes described in the embodiments. The same components are denoted by the same reference numerals throughout the embodiments.

In each of the following embodiments, description will be given of a system including multiple computer systems in each of which a computer program is installed. However, as is apparent to those skilled in the art, one aspect of the disclosure can be implemented as a computer executable program. Accordingly, the disclosure can be implemented as an embodiment as a system including multiple computer systems to each of which a computer program is installed, an embodiment as software, or an embodiment as a combination of software and hardware. Each computer program can be recorded in any computer-readable recording medium such as a hard disk, a DVD, a CD, an optical memory or a magnetic memory.

In each of the following embodiments of the disclosure, taken as an example is a case of performing large-scale program development in a distributed environment. In each of the following embodiments, if a program file is updated by a client, for example, if the program file is updated on a memory of the client, if an updated program file is stored in a work directory of the client, or the like, update information on the update is generated, and the generated update information is collected to a server. Thereby, the server can manage the updated part of the program file. If a different program file including a part related to the received update information is being updated by a different client, warning information indicating that the related program file is being updated by another client is transmitted to the different client. With this configuration, the developer of a different client updating the same part of source code and the developer of a different client updating a program file which may be affected by the part being updated by the client can appropriately plan a test procedure to prevent unnecessary tests. Consequently, waste in program development can be minimized.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, FIG. 1 is a block diagram showing a configuration example of an application development system according to an embodiment (Embodiment 1) of the disclosure. In the application development system according to Embodiment 1, an application development server 1 is connected, to multiple clients 3, 3, . . . used by developers of program development, so as to be capable of data communication with the clients 3, 3, . . . via a network 2.

The application development server 1 includes at least a CPU (central processing unit) 11, a memory 12, a storage 13, an I/O interface 14, a communication interface 15, a video interface 16, a portable disk drive 17, and an internal bus 18 connecting these hardware units.

The CPU 11 is connected, via the internal bus 18, the hardware units of the application development server 1. The CPU 11 controls operation of each of the hardware units, and executes various software functions according to a computer program 100 stored in the storage 13. The memory 12 is configured of a volatile memory such as an SRAM or an SDRAM. A load module is loaded into the memory 12 at the time of execution of the computer program 100, and the memory 12 stores temporary data or the like if the computer program 100 is executed.

The storage 13 is configured of a built-in fixed storage (hard disk), ROM or the like. The computer program 100 stored in the storage 13 is downloaded, by the portable disk drive 17, from a portable storage medium 90 such as a DVD or a CD-ROM in which information on a program, data and the like are recorded. At the time of execution, the computer program 100 is loaded from the storage 13 into the memory 12, and then executed. Needless to say, the computer program 100 may be one downloaded from an external computer connected to the network 2 through the communication interface 15.

The storage 13 includes a program file storing unit 131, an update information storing unit 132, an updating client information storing unit 133 and a program file relationship information storing unit 134. The program file storing unit 131 stores a program file developed and updated most recently by each of the clients 3. Accordingly, by combining program files stored in the program file storing unit 131, the application to be developed can be built in its latest state. The program file storing unit 131 only stores a program file transmitted (uploaded) by each of the clients 3 together with information indicating that development of the program file is completed.

The update information storing unit 132 stores update information on the program updated by each of the clients 3 such as a program file name, updated contents, an updated part, and update time and date of the program file. The update information is generated if the updated program file is stored in a work directory of the client 3, and is then transmitted to the application development server 1. The timing at which the client 3 transmits the update information to the application development server 1 may be when the program file is updated on a memory of the client 3, when the program file is stored in the work directory of the client 3, or in every certain time.

The updating client information storing unit 133 stores, for each program file, information identifying the client 3 performing an update of the program file. If a specified program file is copied as a program file to be updated, by an instruction from the client 3, the updating client information storing unit 133 associates and stores the program file name and information identifying the client 3 which has transmitted the instruction. Note that information associated and stored with the information identifying the client 3 is not limited to the program file name, and may be information identifying the program file obtained by dividing the computer program for one or each of multiple of functions, for example, a method name or a block name.

The program file relationship information storing unit 134 stores information on a relationship between parameters, arguments, functions or the like of program files. Here, the information on a relationship between program files is not limited to information on a relationship between parameters, arguments, functions or the like of program files, and may be information on a relationship between parameters, arguments, functions or the like of methods or information on a relationship between parameters, arguments, functions or the like of blocks.

Alternatively, similarity degrees between program files may be calculated by a known method, and may each be stored in the program file relationship information storing unit 134 in association with the corresponding program file names. In this case, if a stored similarity degree is higher than a predetermined value, it can be judged that a conflict is highly likely to occur in the program development.

The communication interface 15 is connected to the internal bus 18, and is also connected to the external network 2 such as the Internet, a LAN or a WAN, so that the communication interface 15 allows the application development server 1 to perform data transmission and reception with the clients 3, 3, . . . and the like.

The I/O interface 14 is connected to data input media such as a keyboard 21 and a mouse 22, and receives an input of data. The video interface 16 is connected to a display 23 such as a CRT monitor or an LCD, and displays a predetermined image.

Figure 2:
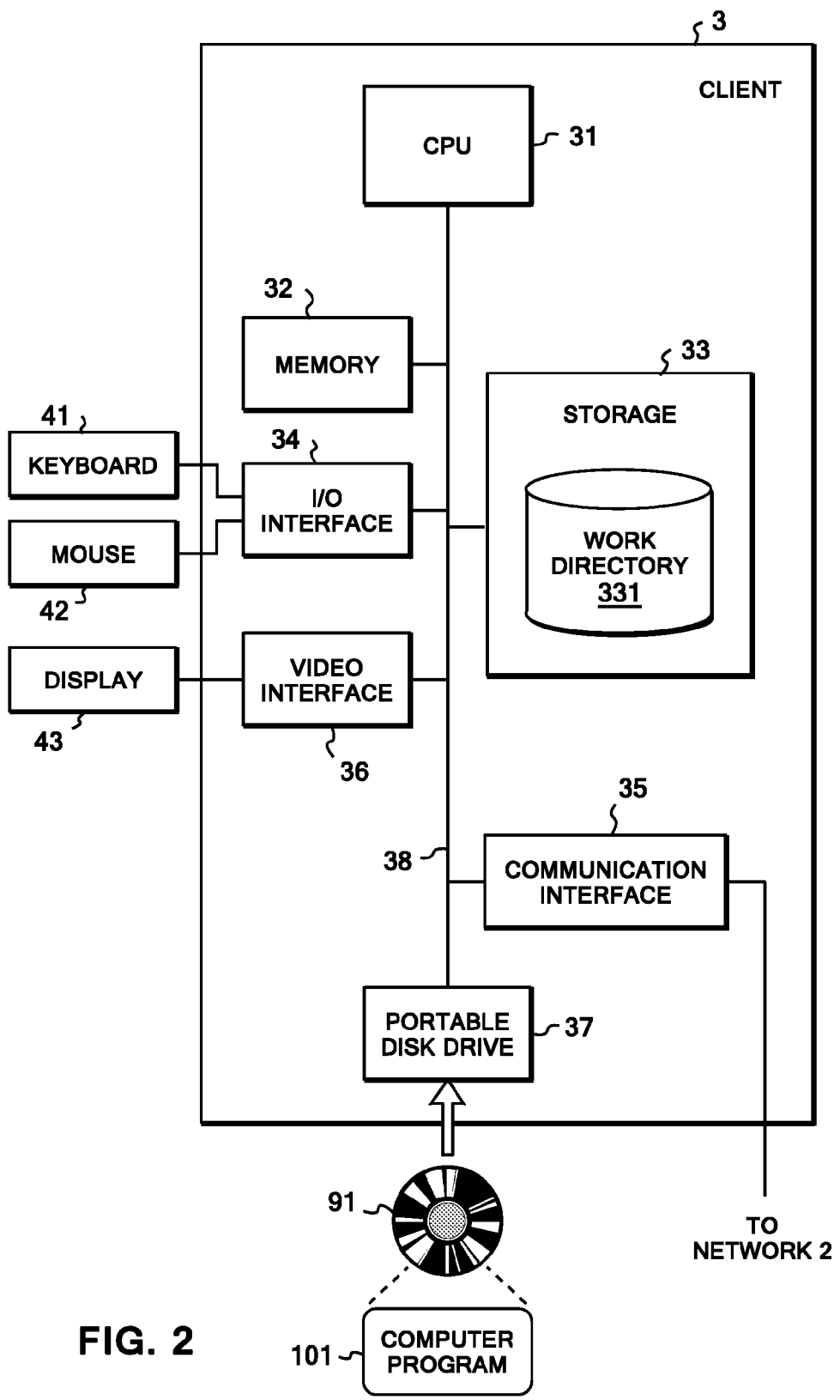
FIG. 2 is a block diagram showing a configuration example of a client according to Embodiment 1 of the disclosure.

FIG. 2 is a block diagram showing a configuration example of the client 3 according to Embodiment 1. The client 3 according to Embodiment 1 includes at least a CPU (central processing unit) 31, a memory 32, a storage 33, an I/O interface 34, a communication interface 35, a video interface 36, a portable disk drive 37, and an internal bus 38 connecting these hardware units.

The CPU 31 is connected, via the internal bus 38, the hardware units of the client 3. The CPU 31 controls operation of each of the hardware units, and executes various software functions according to a computer program 101 stored in the storage 33. The memory 32 is configured of a volatile memory such as an SRAM or an SDRAM. A load module is loaded into the memory 32 at the time of execution of the computer program 101, and the memory 32 stores temporary data or the like if the computer program 101 is executed. If a program file to be updated is also loaded into the memory 32, the update information may be generated if the program file on the memory 32 is updated.

The storage 33 is configured of a built-in fixed storage (hard disk), ROM or the like. The computer program 101 stored in the storage 33 is downloaded, by the portable disk drive 37, from a portable storage medium 91 such as a DVD or a CD-ROM in which information on a program, data and the like is recorded. At the time of execution, the computer program 101 is loaded from the storage 33 into the memory 32, and then executed. Needless to say, the computer program 101 may be one downloaded from an external computer connected to the network 2 through the communication interface 35. The storage 33 includes a work directory 331 storing a program file being developed. The update information may be generated if an updated program file is stored in the work directory 331.

The communication interface 35 is connected to the internal bus 38, and is also connected to the external network 2 such as the Internet, a LAN or a WAN, so that the communication interface 35 allows the client 3 to perform data transmission and reception with the application development server 1, other clients 3, 3, . . . and the like.

The I/O interface 34 is connected to data input media such as a keyboard 41 and a mouse 42, and receives an input of data. The video interface 36 is connected to a display 43 such as a CRT monitor or an LCD, and displays a predetermined image.

Figure 3:
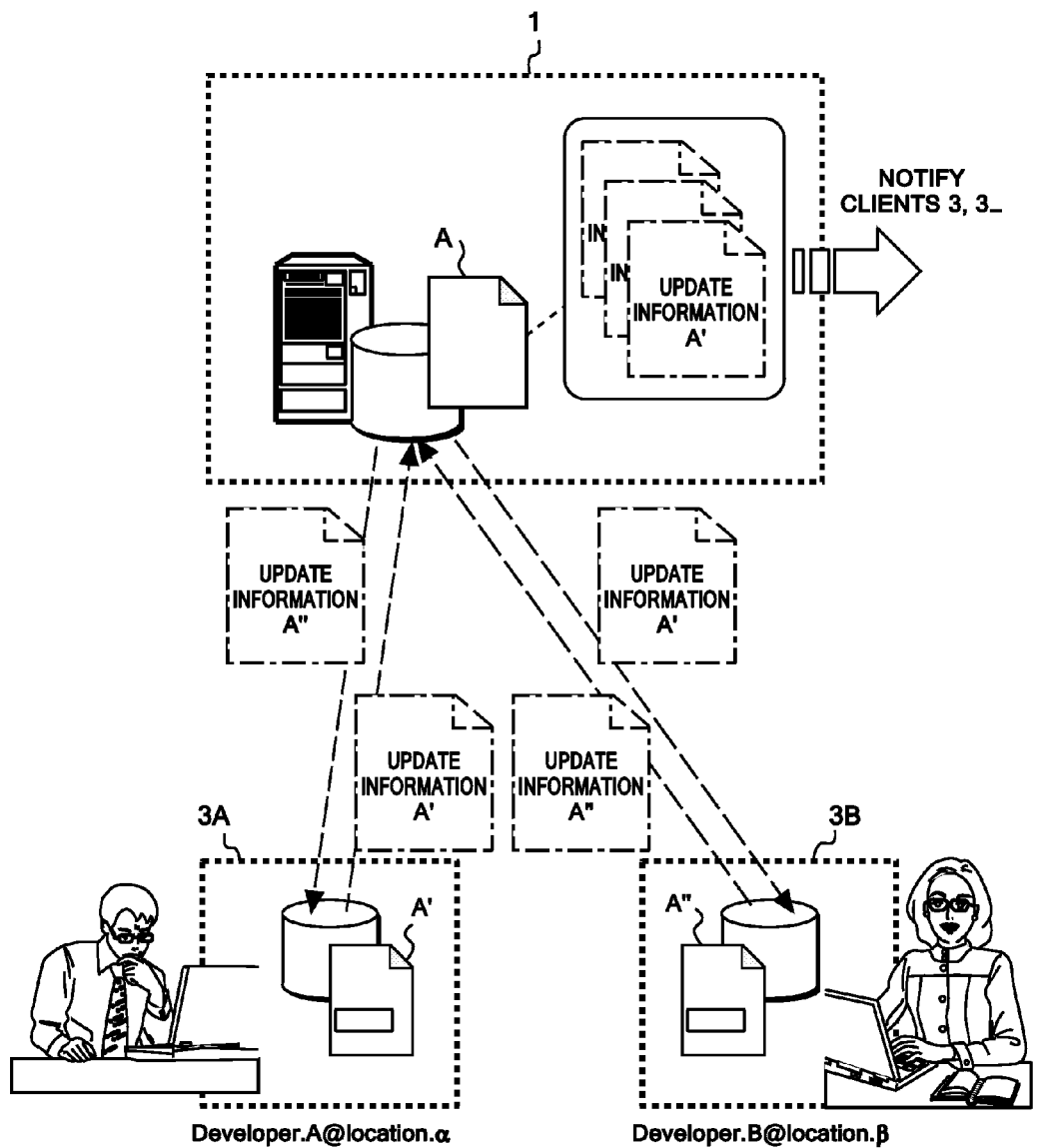
FIG. 3 is a schematic view showing a flow of update information in the application development system according to Embodiment 1 of the disclosure.

Description will be given below of operation of the application development system using the application development server 1 having the above-described configuration. FIG. 3 is a schematic view showing a flow of update information in the application development system according to Embodiment 1 of the disclosure. In FIG. 3, it is assumed that a developer Developer.A is updating a program file A by using a client 3A while a developer Developer.B is updating a program file B by using a client 3B in a distributed environment, and that update information is generated if an updated program file is stored in the work directory 331 of the client 3A or the client 3B. Here, update information may, of course, be generated if a program file is generated on the memory 32 of the client 3A or the client 3B.

The developer Developer.A copies a program file A stored in the program file storing unit 131 of the application development server 1, downloads the copied program file A, updates the downloaded program file A, and thereby generates a new program file A'. The program file A' obtained by the update is stored in the work directory 331 of the client 3A. Here, information indicating that the program file A is copied to the client 3A is stored in the updating client information storing unit 133 of the application development server 1.

Meanwhile, the developer Developer.B also copies a program file A stored in the program file storing unit 131 of the application development server 1, downloads the copied program file A, updates the downloaded program file A, and thereby generates a new program file A". The program file A" obtained by the update is stored in the work directory 331 of the client 3B. Here, information indicating that the program file A is copied to the client 3B is also stored in the updating client information storing unit 133 of the application development server 1.

If the new program file A' is stored as an updated file in the work directory 331, the client 3A generates update information A' which identifies the updated program file and includes at least a program file name A, an updated part, updated contents, update date and time, and the like of the program file, for example. Then, the client 3A transmits the update information A' to the application development server 1. At this point, the program file A', obtained by the update, itself is not transmitted to the application development server 1, and only the update information A' is transmitted. The update information A' thus transmitted is stored in the update information storing unit 132 of the application development server 1.

Upon receipt of the update information A', the application development server 1 refers to the program file relationship information storing unit 134, and thereby judges, on the basis of the updated contents included in the update information A', whether or not there is a program file which may possibly be affected by the update. In the example in FIG. 3, since the same program file A is copied to the client 3B, it is apparent that the update may affect the update being performed by the client 3B.

On the basis of this judgment, the application development server 1 transmits the update information A' to the client 3B whose update is considered to be affected by the update by the client 3A, and notifies the client 3B of the updated contents included in the update information A'. Thereby, the developer Developer.B updating the program file A by using the client 3B can realize that the developer Developer.A, who is a third party, updated the program file A. Accordingly, the developer Developer.B can plan a test procedure, for example, to perform a build test after the program file A' obtained by the update by the developer Developer.A is uploaded to the application development server 1. In this way, the developer Developer.B can avoid performing unnecessary tests, which can consequently minimize waste in the program development.

If the new program file A" is stored as an updated file in the work directory 331, the client 3B generates update information A" which identifies the updated program file and includes at least a program file name A, an updated part, updated contents, update date and time, and the like of the program file, for example. Then, the client 3B transmits the update information A" to the application development server 1. At this point, the program file A", obtained by the update, itself is not transmitted to the application development server 1, and only the update information A" is transmitted. The update information A" thus transmitted is stored in the update information storing unit 132 of the application development server 1.

Upon receipt of the update information A", the application development server 1 refers to the program file relationship information storing unit 134, and thereby judges, on the basis of the updated contents included in the update information A", whether or not there is a program file which may possibly be affected by the update. In the example in FIG. 3, since the same program file A is copied to the client 3A, it is apparent that the update may affect the update being performed by the client 3A.

On the basis of this judgment, the application development server 1 transmits the update information A" to the client 3A whose update is considered to be affected by the update by the client 3B, and notifies the client 3A of the updated contents included in the update information A". Thereby, the developer Developer.A updating the program file A by using the client 3A can realize that the developer Developer.B, who is a third party, updated the program file A. Accordingly, the developer Developer.A can plan a test procedure, for example, to perform a build test after the program file A" obtained by the update by the developer Developer.B is uploaded to the application development server 1. In this way, the developer Developer.A can avoid performing unnecessary tests, which can consequently minimize waste in the program development.

As described above, update information is generated and then transmitted to the application development server 1, if an updated program file is stored in the work directory 331 of the corresponding client 3. With this configuration, the application development server 1 can notify a different client 3 of the updated contents, the client 3 having received a copy of a program file considered to be affected by the updated contents included in the update information. Thereby, the client 3 can be informed of an update state of the third party even before the program file obtained by the update is stored in the program file storing unit 131 of the application development server 1.

A method to be employed for notifying the client 3 of the updated contents is not particularly limited, and the updated contents may be notified by transmitting an electronic mail with the update information. For example, to the client 3B, the update information A' is transmitted by being attached to a notification mail to be sent to a mail address of the developer Developer.B, Developer.B@location.β; to the client 3A, the update information A" is transmitted by being attached to a notification mail to be sent to a mail address of the developer Developer.A, Developer.A@location.α.

Figure 4:
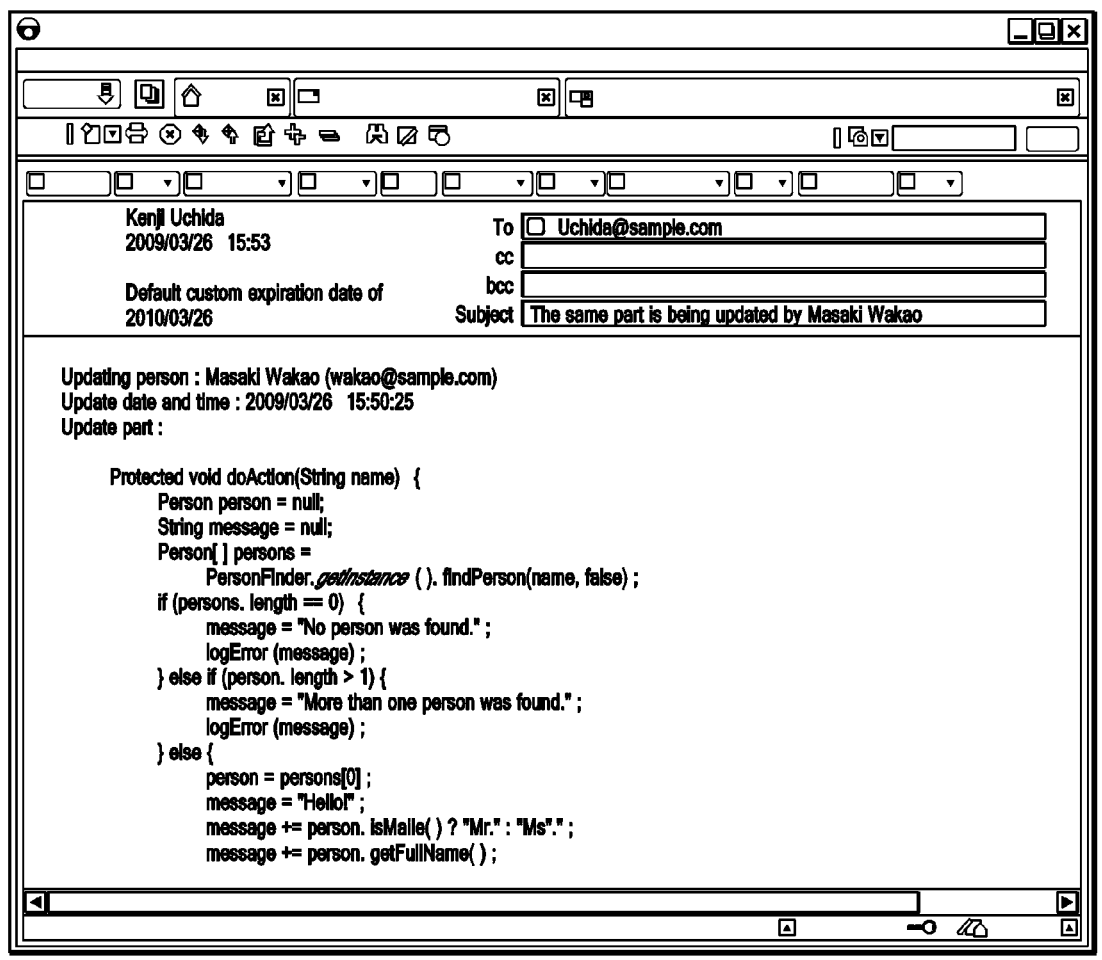
FIG. 4 is an illustration of a notification mail transmitted as warning information for notifying a client of a possibility of a conflict attributable to an update by a different client.

FIG. 4 is an illustration of a notification mail transmitted as warning information for notifying a client of a possibility of a conflict attributable to an update by a different client. As shown in FIG. 4, a notification mail indicating a developer and a part being updated by the developer is transmitted together with the source code of the update target block. Information on the updated contents is included in generated update information, and is read if the notification mail is created. The update information may, of course, be transmitted by being directly attached to warning information as an attachment file.

Figure 5:
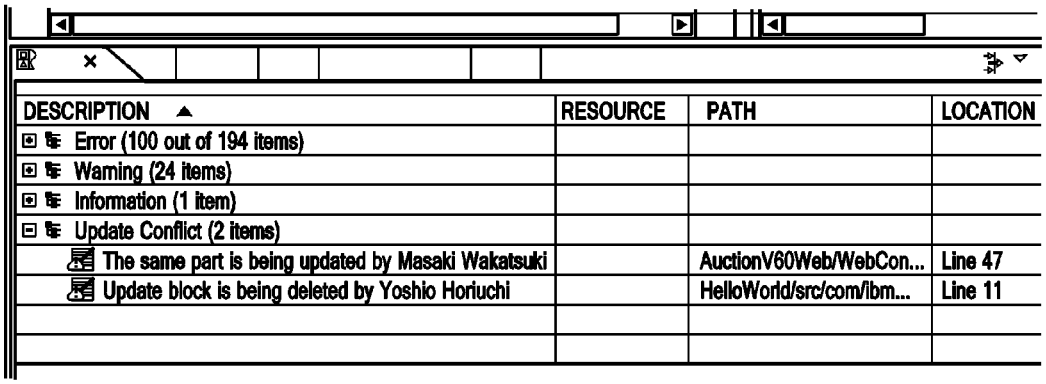
FIG. 5 is an illustration of a view display screen of an editor.

The update information may be transmitted as warning information instead of using a notification mail, and may be displayed in a problem view or the like of the editor used by the client 3, for example. FIG. 5 is an illustration of a view display screen of an editor. In the example in FIG. 5, the view display screen of the editor includes a field for "change conflict," in addition to fields showing a source code structure error, warning and the like. Even if the editor is not started to update a program file at the time of receiving the update information, whether any conflict is occurring in the update can be checked at any time after the editor is started, since the contents of the received update information is displayed in the field for "change conflict."

Moreover, the application development server 1 associates and stores received update information and a corresponding update target program file. Then, if each client 3 starts the editor to update a program file, the application development server 1 transmits the corresponding update information by attaching the update information to the program file to be downloaded by the client 3. If update information is attached to the downloaded program file, information indicating that update information is attached is displayed at the client 3.

Figure 6:
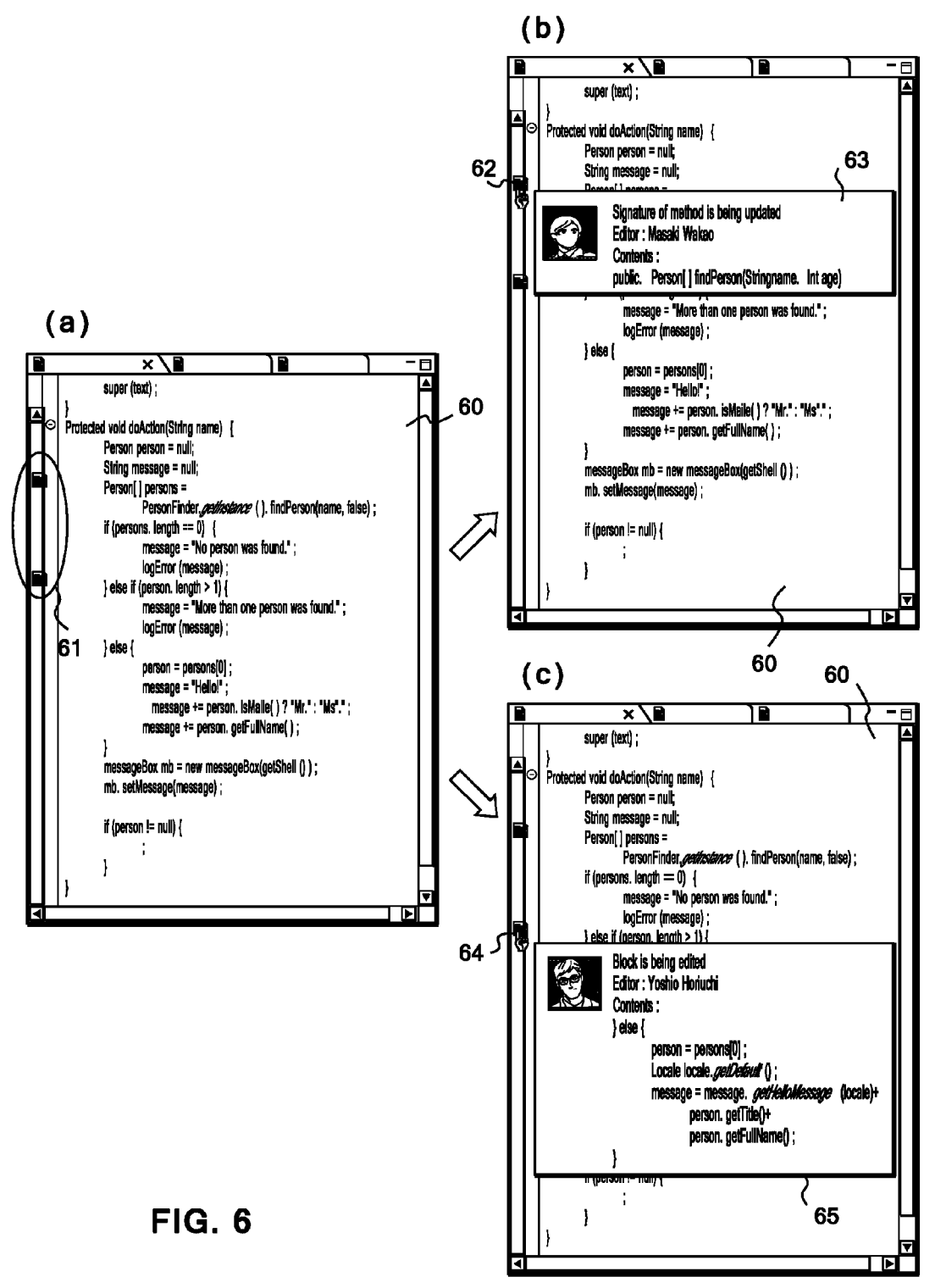

FIGS. 6A, 6B and 6C are each an illustration of an editor screen. As shown in FIG. 6A, the editor screen includes, in addition to a source code update area 60, a display area 61 for displaying, for each line of source code, an icon or the like indicating that update information is attached. As shown in FIG. 6B, if information 62 indicating that update information is attached is, for example, an icon or the like is displayed as information indicating that warning information has been received, in the display region 61, a window 63 for displaying updated contents is displayed by a mouse operation of moving the cursor to the information 62 indicating that update information is attached. The information 62 indicating that update information is attached indicates that a signature of a method such as access level, parameter or the like is updated.

Meanwhile, as shown in FIG. 6C, if information 64 indicating that update information is attached is displayed in the display region 61, a window 65 for displaying updated contents is displayed by a mouse operation of moving the cursor to the information 64 indicating that update information is attached. The information 64 indicating that update information is attached indicates that a block under "else" is updated.

As described above, easy visual recognition of a part of source code to which update information is attached is possible, and information on updated contents can be displayed by a simple operation. Thereby, a conflict in update of a program file can be prevented from occurring.

Figure 7:
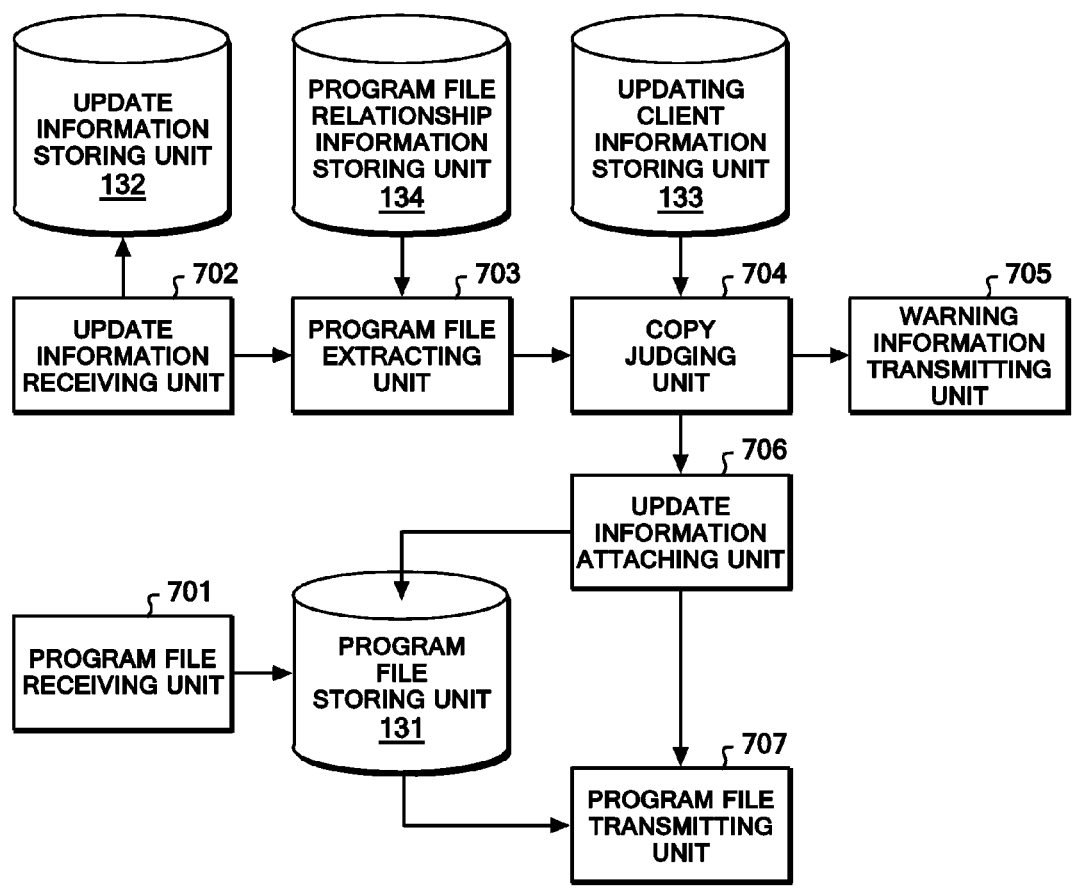
FIG. 7 is a functional block diagram of an application development server according to Embodiment 1 of the disclosure.

FIG. 7 is a functional block diagram of the application development server 1 according to Embodiment 1 of the disclosure. Normally, if each client 3 connected to the application development server 1 via the network 2 develops and updates a program file, the operation-completed program file is received by a program file receiving unit 701, and is then stored in a program file storing unit 131. The program files stored in the program file storing unit 131 are the most-up-to-date program files, and are hence used if a build test or the like is performed.

An update information receiving unit (first receiving unit) 702 receives update information on updated contents and the like of the program file generated by the client 3. The received update information is stored in the update information storing unit 132.

On the basis of the received update information and information on relationships between the program files stored in the program file relationship information storing unit 134, a program file extracting unit (extracting unit) 703 extracts a program file which may be affected by the updated contents specified in the update information. Examples of the program file to be extracted include a program files which are the source and the destination of a parameter, and the like as well as methods, blocks, source code and the like including a function using the same argument, for example.

A copy judging unit 704 refers to the updating client information storing unit 133, and then judges whether or not the extracted program file has been copied and transmitted to a different client 3, that is, whether or not the extracted program file may be updated. If the program file is to be updated, a conflict may occur in the update.

If a conflict may occur in an update of the program file specified in the received update information, by the update by a third party, a warning information transmitting unit (second information transmitting unit) 705 transmits warning information indicating the possibility of a conflict. The destination to which the warning information is to be transmitted is read from the updating client information storing unit 133. The warning information to be transmitted is not particularly limited, and a mode in which the warning information is displayed at the different client 3 is not limited either.

An update information attaching unit (information attaching unit) 706 stores the update information in association with the extracted program file, in the program file storing unit 131.

If the different client 3, who is a third party, transmits, to update a program file, an instruction to copy the program file to be updated, the program file transmitting unit (file transmitting unit) 707 also copies corresponding update information stored in the program file storing unit 131, and then transmits the copied update information together with the program file. Thus, even though an update by a third party has not been performed when corresponding update information was transmitted to the application development server 1, the third party can refer to the update information if being to update the program file at some later point. Hence, a conflict in the update can be prevented from occurring.

Figure 8:
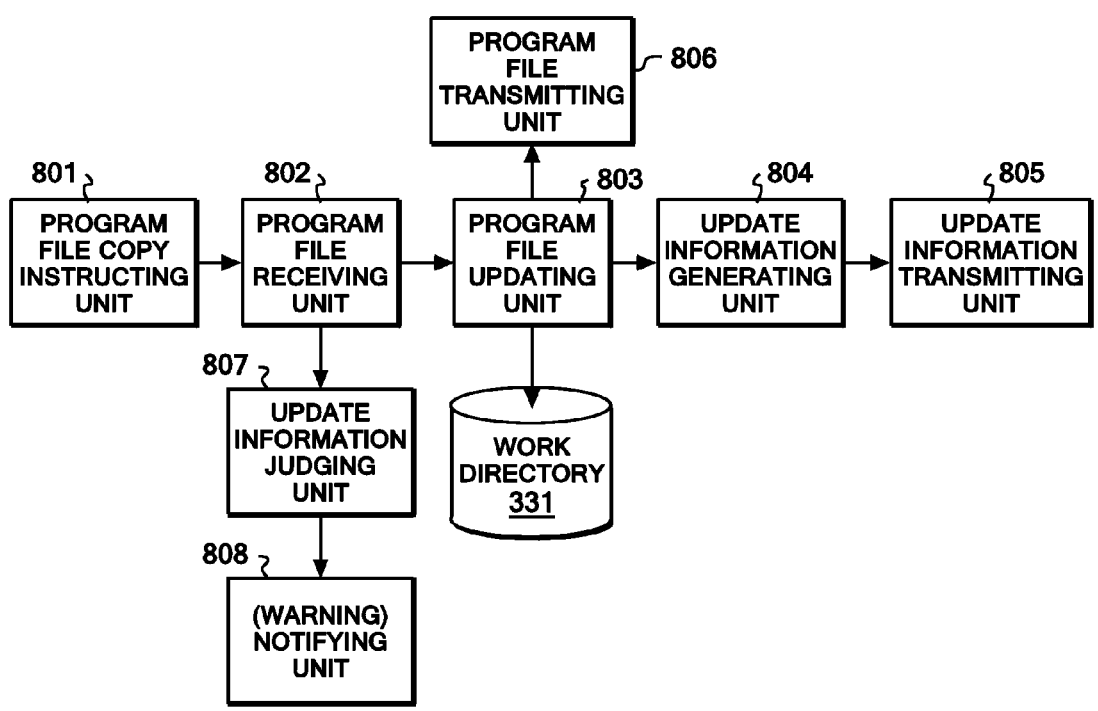
FIG. 8 is a functional block diagram of the client according to Embodiment 1 of the disclosure.

FIG. 8 is a functional block diagram of the client 3 according to Embodiment 1 of the disclosure. A program file copy instructing unit (instruction transmitting unit) 801 specifies a program file to be updated, and transmits an instruction to the application development server 1 to copy and transmit the program file. A program file receiving unit (file receiving unit) 802 receives the program file to be updated, from the application development server 1.

A program file updating unit 803 updates contents of the received program file, and then stores the updated program file as an updated file in the work directory 331. When the update is completed, a program file transmitting unit 806 transmits the updated program file to the application development server 1, and the updated program file is stored in the program file storing unit 131.

If the updated program file is stored in the work directory 331 while the update is still in progress, an update information generating unit (generating unit) 804 generates update information. The generated update information includes at least a program file name, updated contents, an updated part, update date and time, and the like of the program file updated by the client 3. The update information may, of course, be generated if the program file is updated on the memory 32.

An update information transmitting unit (first information transmitting unit) 805 transmits the generated update information to the application development server 1. By transmitting the update information generated if the program file is updated by the client 3, the application development server 1 can acquire information, such as the program file name, updated contents, updated part and update date and time, of the program file in a state which has not been stored in the program file storing unit 131 of the application development server 1. Thus, the application development server 1 can accurately acquire updated contents of a program file updated by each client 3.

An update information judging unit (information judging unit) 807 judges whether or not update information is attached to the program file received as the update target. If update information is attached, the client 3 can detect that a third party is updating the program file, and can also acquire the updated contents of the update.

A (warning) notifying unit 808 notifies the developer using the client 3 of the information indicating that update information is attached to the program file. Moreover, if warning information indicating that a conflict may occur in an update of the program file specified in the update information, due to the update by the third party, is received, the notifying unit 808 also notifies the developer of the information that warning information is received. A notification method is not particularly limited, and may display an icon in the display area 61 as shown in the example in FIG. 6, for example.

Figure 9:
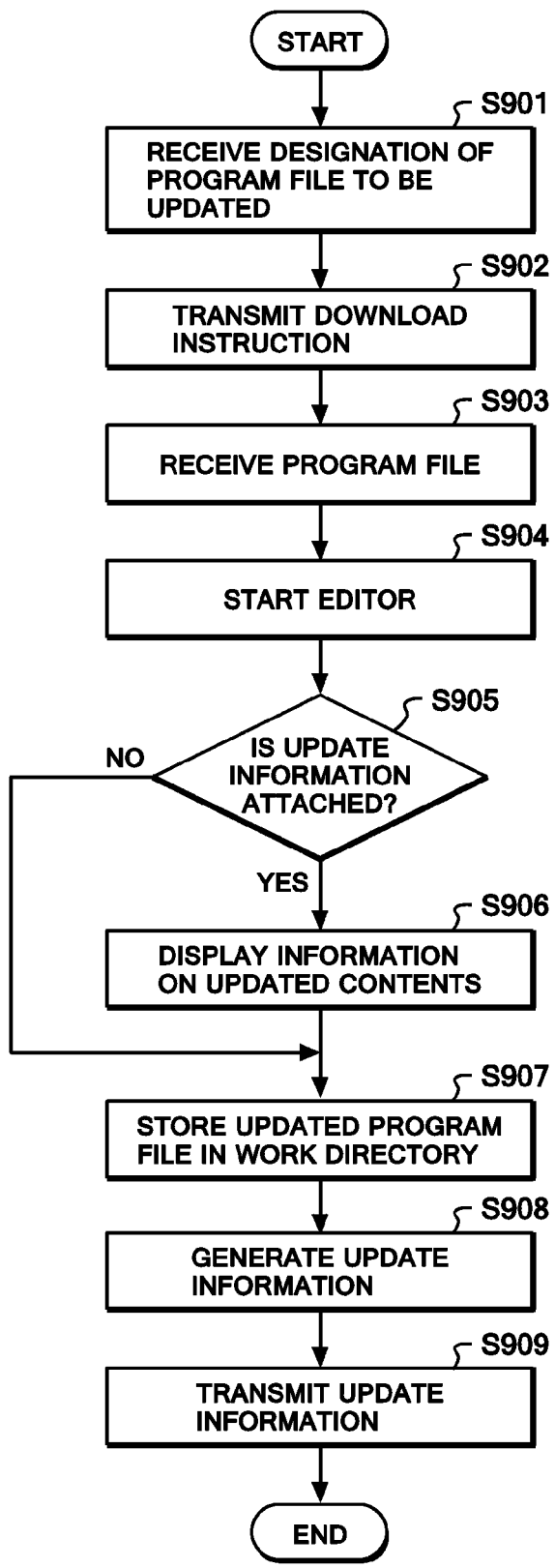
FIG. 9 is a flowchart showing a procedure of processing performed by a CPU of the client according to Embodiment 1 of the disclosure.

FIG. 9 is a flowchart showing a procedure of processing performed by the CPU 31 of the client 3 according to Embodiment 1 of the disclosure. The CPU 31 of the client 3 receives a designation of a program file to be updated (Step S901). A method of receiving a designation of a program file is not particularly limited. Employed may be a method in which a list of program files updatable by the developer using the client 3 is displayed on the display 43 and selection is made by an operation using the mouse 42, or in which the program file name is directly inputted by using the keyboard 41.

The CPU 31 transmits, to the application development server 1, an instruction to download the designated program file (Step S902). Upon receipt of the download instruction, the application development server 1 copies the designated program file from the program file storing unit 131, and then transmits the copied program file to the client 3 which has transmitted the download instruction. Thereafter, the application development server 1 stores, in the updating client information storing unit 133, the program file name in association with information identifying the client which has transmitted the download instruction, for example, a client ID.

The CPU 31 receives the program file transmitted from the application development server 1 (Step S903), and then starts the editor for updating source code of a program file (Step S904). The editor may be started by the CPU 31 if the program file is received, or by an input from the developer.

The CPU 31 judges whether or not update information is attached to the received program file (Step S905). If judging that update information is attached (YES in Step S905), the CPU 31 judges that a conflict may occur in an update by a third party, and displays, on the display 43, information on the updated contents included in the update information (Step S906).

If judging that no update information is attached to the received program file (NO in Step S905), the CPU 31 skips Step S906, and stores the updated program file in the work directory 331 (Step S907). In other words, the updated program file before completion of a build test is stored in the work directory 331.

If the updated program file is stored in the work directory 331, the CPU 31 generates new update information (Step S908). The generated update information includes at least the program file name, updated contents, updated part, update date and time, and the like of the updated program file. Needles to say, the update information may be generated if the program file is updated on the memory 32.

The CPU 31 transmits the generated update information to the application development server 1 (Step S909). Upon receipt of the update information, the application development server 1 performs processing for checking whether or not a conflict is occurring in any update.

Figure 10:
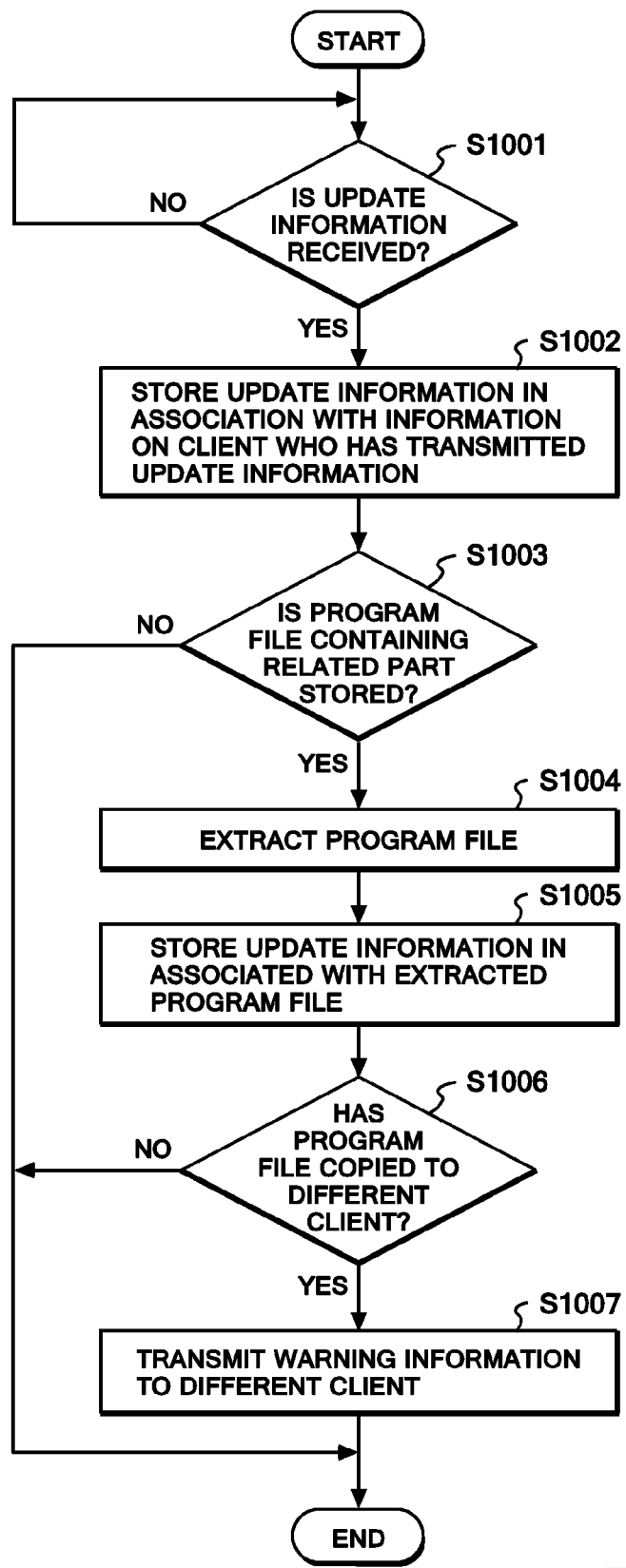
FIG. 10 is a flowchart showing a procedure of processing performed by a CPU of the application development server according to Embodiment 1 of the disclosure.

FIG. 10 is a flowchart showing a procedure of processing performed by the CPU 11 of the application development server 1 according to Embodiment 1 of the disclosure. The CPU 11 of the application development server 1 judges whether or not update information is received from the client 3 (Step S1001). If judging that no update information is received (NO in Step S1001), the CPU 11 enters a reception waiting state.

If judging that update information is received (YES in Step S1001), the CPU 11 stores, in the update information storing unit 132, the update information in association with information on the client 3 which has transmitted the update information (Step S1002). By storing the update information in association with the information on where the update information has been transmitted from, the application development server can easily identify the client 3 performing an update likely to encounter a conflict.

The CPU 11 judges whether or not a program file including a part related to the information on the updated contents included in the update information is stored in the program file storing unit 131 (Step S1003). This is because a conflict is highly likely to occur in an update of a program file including a part related to the information.

If judging that a program file including a part related to the information on the updated contents is stored (YES in Step S1003), the CPU 11 extracts the program file including a part related to the information on the updated contents (Step S1004), and then stores the update information in association with the extracted program file (Step S1005). Specifically, the update information is attached to the program file stored in the program file storing unit 131. With this configuration, if the program file to which the update information is attached is copied for a subsequent update, the update information can be transmitted, together with the copied program file, to the client 3 for which the program file is copied. Thereby, the developer can detect that a conflict may occur in the update, and can employ means for preventing a conflict. Consequently, a conflict can be prevented from occurring.

The CPU 11 judges whether or not the extracted program file is copied to a different client 3, that is, a client 3 different from the client 3 which has transmitted the update information (Step S1006). If judging that the program file is copied to a different client 3 (YES in Step S1006), the CPU 11 judges that a conflict is highly likely to occur in the update, and transmits warning information indicating that a conflict may occur in the update, to the different client for which the program file is copied (Step S1007). If judging that the program file is not copied to a different client 3 (NO in Step S1006), the CPU 11 skips Step S1007 and terminates the processing.

If judging that no program file including a part related to the information on the updated contents is stored (NO in Step S1003), the CPU 11 terminates the processing.

As described above, according to Embodiment 1, if a program file is updated at the client 3, for example, if an updated program file is stored in the work directory 331 of the client 3, update information on the update is generated, and the generated update information is collected to the application development server 1. Thereby, the application development server 1 can know which part of which program file is updated. If a different client 3 is updating a different program file including a part related to the received update information, warning information indicating that the related program file is being updated by another client 3 is transmitted. Thereby, the developer of each client 3 updating the same part of source code, the developer of each client 3 updating a program file which may be affected by the updated part, and the like can appropriately plan a test procedure so as not to perform any unnecessary test in the updates. Consequently, waste in program development can be minimized.

The configuration of a system according to an embodiment (Embodiment 2) of the disclosure is the same as that according to Embodiment 1. Hence, each component is attached by the same reference numeral as that used in Embodiment 1, and detailed description thereof is omitted. Embodiment 2 is different from Embodiment 1 in that the source code of a program file is analyzed and information on the structure of the program file is stored in advance, in order to highly accurately judge whether or not a program file including a part related to information on an update is stored.

Figure 11:
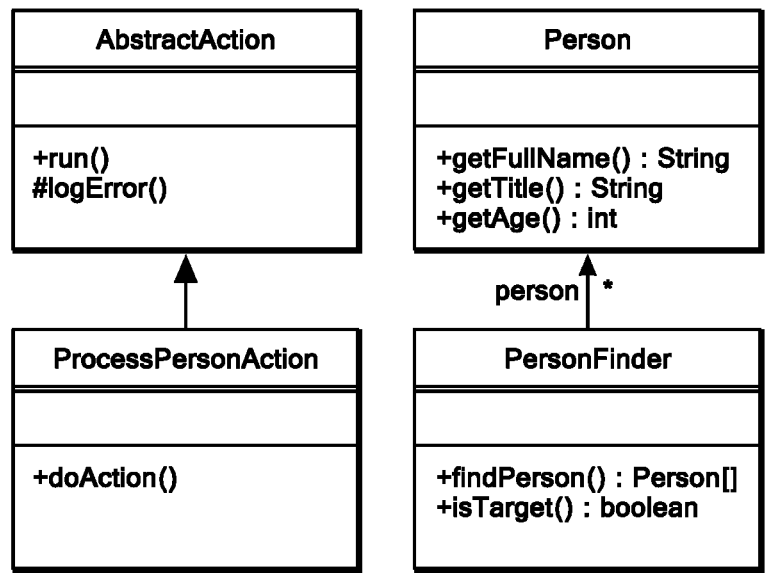
FIG. 11 is a class diagram of an assumed application.

Description will be given by using, as an example, a case of developing an application having the following class structure. FIG. 11 is a class diagram of an assumed application. In the example in FIG. 11, four classes, "AbstractAction," "ProcessPersonAction," "Person" and "PersonFinder," are set, and one or multiple methods are defined for each of the classes.

A method of the class "AbstractAction" is inherited to the class "ProcessPersonAction," and a method "findPerson( )" defined in the class "PersonFinder" is called by a method "doAction( )" defined in the class "ProcessPersonAction."

Figure 12:
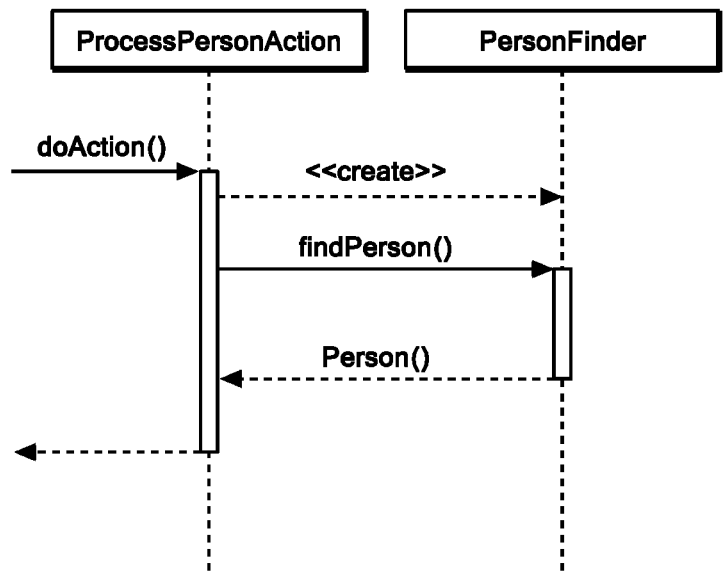
FIG. 12 is a sequence diagram of the assumed application.

FIG. 12 is a sequence diagram of the assumed application. In the example in FIG. 12, firstly, an instance "ProcessPersonAction" is generated by a method call by a third party. Then, by the method "doAction( )" defined in the instance "ProcessPersonAction," the method "findPerson( )" defined in the class "PersonFinder" is called, and, at this point, the instance "PersonFinder" is generated. The instance "PersonFinder" extracts an array based on the class "Person" and returns the array to the instance "ProcessPersonAction" which has called the method "findPerson( )."

Figure 13:
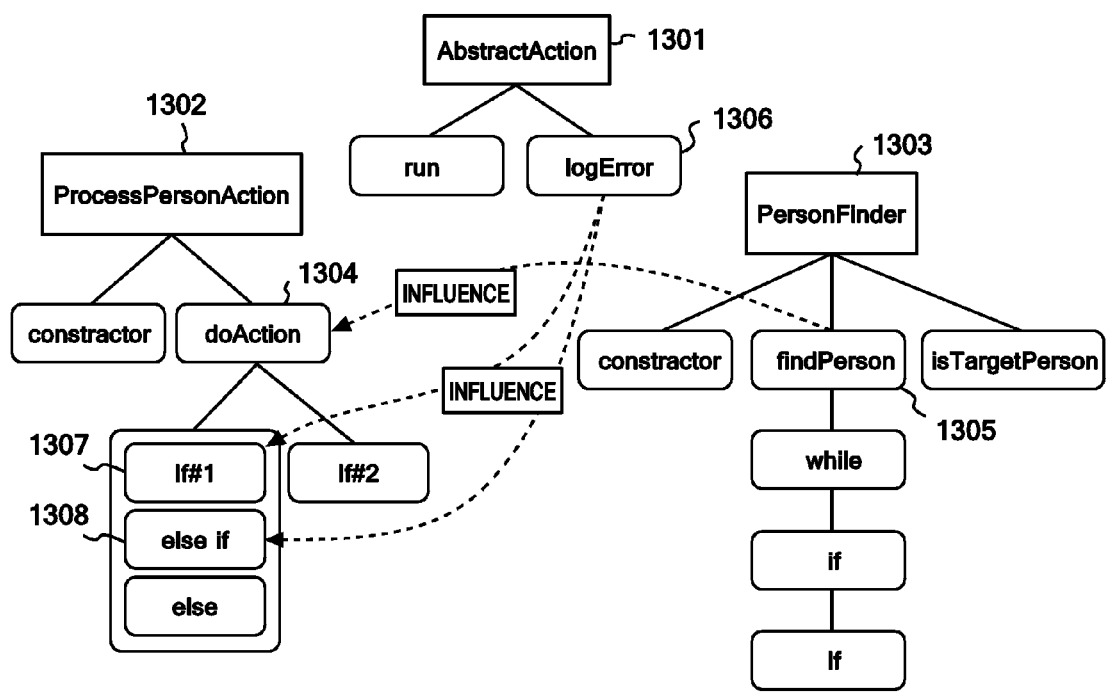
FIG. 13 is an illustration of a program file structure obtained by analyzing source code of the assumed application.

By using, as a basis, the source code of the program file including the classes shown in FIG. 11 and FIG. 12, the structure of the program file is analyzed on the basis of the classes, methods and blocks by a known method. FIG. 13 is an illustration of a program file structure obtained by analyzing the source code of the assumed application. The source code based on the structure analysis of the program file shown in FIG. 13 is the source code shown in the update region 60 in FIG. 6.

As shown in FIG. 13, the structure of the program file is shown in a tree structure for each of three classes, "AbstractAction" 1303, "ProcessPersonAction" 1302 and "PersonFinder" 1303 on the basis of each defined method and each block in the source code.

For example, since a method "findPerson" 1305 defined in the class "PersonFinder" 1303 is called by a method "doAction" 1304 defined in the class "ProcessPersonAction" 1302, the method "doAction" 1304 is affected if the parameter of the method "findPerson" 1305 is updated. Accordingly, the method "doAction" 1304 should be stored as a part related to information on the updated contents in update information on an update of the method "findPerson" 1305.

Similarly, if the parameter of a method "logError" 1306 defined in the class "AbstractAction" 1301 is updated, blocks 1307 and 1308 in the method "doAction" 1304 calling the function "logError" in the source code are affected. Accordingly, the blocks 1307 and 1308 should be stored as parts related to information on the updated contents in update information on the method "doAction" 1304.

As described above, the structure of a program file is analyzed in advance, and parts related to information on updated contents such as relationships between parameters and passing of parameters are stored in a program file relationship information storing unit 134. Thereby, whether or not a conflict occurs in an update can be judged highly accurately.

Figure 14:
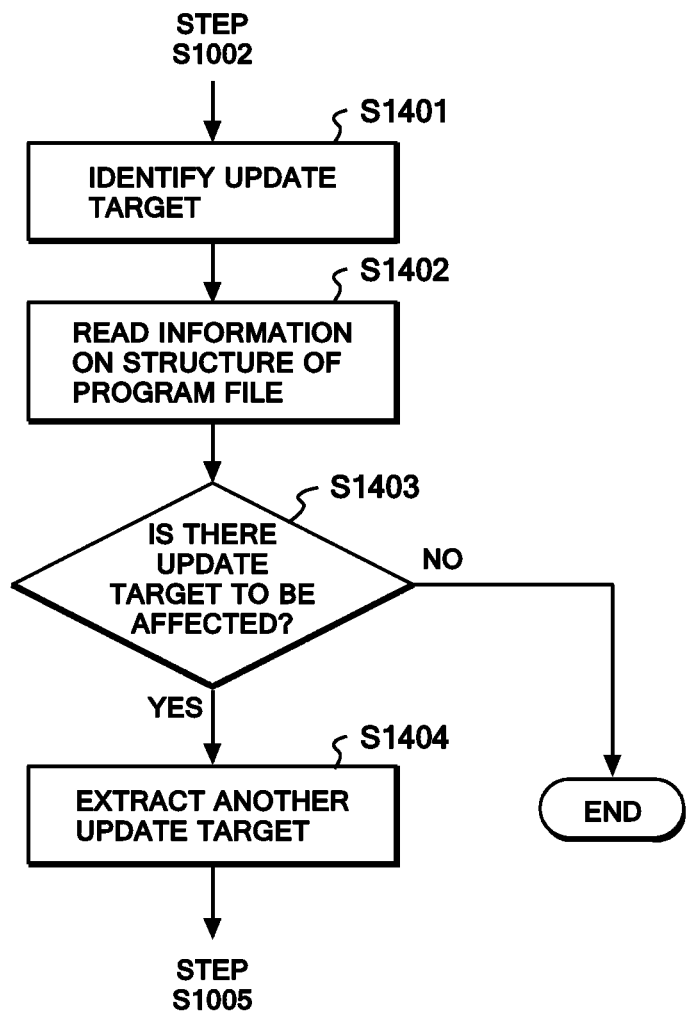
FIG. 14 is a flowchart showing a procedure of processing performed by a CPU of an application development server according to Embodiment 2 of the disclosure.

FIG. 14 is a flowchart showing a procedure of processing performed by a CPU 11 of an application development server 1 according to Embodiment 2 of the disclosure. The CPU 11 of the application development server 1 stores, in an update information storing unit 132, update information in association with information on a client 3 which has transmitted the update information (Step S1002), and identifies an update target on the basis of the update information (Step S1401). The update target is not limited to a program file, and may be a method, a block or the like, for example.

The CPU 11 reads information on the structure of the program file stored in the program file relationship storing unit 134 (Step S1402), and then judges whether or not there is a different update target stored as an update target to be affected (Step S1403). If judging that there is a different update target (YES in Step S1403), the CPU 11 extracts the different update target (Step S1404), and continues to perform processing in Step S1005 and thereafter. If judging that there is no other update target (NO in Step S1403), the CPU 11 terminates the processing.

As described above, according to Embodiment 2, if a program file, a method, a block or the like including a part related to received update information is being updated by a different client 3, warning information indicating that the related program file, method, block or the like is being updated by another client 3 is transmitted to the different client 3. Thereby, the developer of each client 3 updating the same part of source code, the developer of each client 3 updating a program file, a method, a block or the like which may be affected by the updated part, and the like can appropriately plan a test procedure. Thereby, waste in program development can be minimized.

Note that the disclosure is not limited to the above-described embodiments, and various modifications, improvements and the like are possible within the scope of the disclosure. For example, the program file storing unit 131, the program file relationship information storing unit 134 and the like may be provided to a storage in an external computer connected to the application development server according to any one of the above-described embodiments via the network 2, and read and write may be performed on the storing units as needed. Alternatively, information may be stored in a virtual disk in the network 2. Moreover, a build server for executing an application test may be provided separately.

In addition, application of the disclosure is not limited to large-scale program development performed in a distributed environment. The same effects can be expected if the disclosure is applied to various file updates performed in a distributed environment such as document composition or document update in a structured language, for example, HTML, XML or the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for avoiding conflicts when serving files to a plurality of clients capable of updating the files comprising:

collecting and storing a plurality of files at a server communicatively linked to a plurality of clients, wherein said files are stored in a tangible storage medium communicatively linked to the server;

copying a file, and transmitting copies of the file to a first set of clients;

receiving update information comprising updates associated with the transmitted copies of the file, and respective identifiers of each of the first set of clients along with their respective updates;

extracting, from the file, parts related to the received update information, wherein the extracting includes identifying relationships between parameters passed among the parts of the file or passed among the plurality of files stored at the server;

storing the update information in association with the extracted parts of the file in a repository separate from the file, without updating the file at the server;

judging, based on the stored update information and extracted parts, whether the file has been copied and updated by one or more clients of the plurality of clients other than the first set of clients; and responsive to the judging that the file has been copied and updated by one or more other clients, transmitting warning information to all clients, the warning information including update information and including the respective identifiers of the clients submitting updates and indicating that the file copies received by the first set of clients are outdated versions of the file.

2. The method according to claim 1, further comprising:

storing the update information in association with the file; and transmitting the file together with the update information stored in association with the file.

3. The method according to claim 2, further comprising:

storing information on structures of files to be updated, wherein the extracting of the file containing the part related to the update information, extracts on the basis of the stored information on the structures of the files.

4. The method according to claim 3, wherein the information on the structures of the file contains information on parameter passing between the files.

5. The method according to claim 1, wherein the files are program files for program development.

6. The method according to claim 1, wherein the collecting and storing of the plurality of files, the receiving the update information, the extracting the file, the judging, and the transmitting of the warning information are performed by at least one computer program when the at least one computer program is executed on the server, wherein the at least one computer program is stored in a tangible, non-transitory storage medium.

7. A method for avoiding conflicts in a distributed environment deploying a plurality of clients, each of which are communicatively linked to a server, which collects and stores a plurality of files in a tangible storage medium, wherein said plurality of files are updatable by the plurality of clients, said method comprising:

transmitting, to the server from one of the clients, an instruction to copy a certain file for update, wherein said certain file is one of said plurality of files;

receiving, at the one client, a first file, which is a copy of the certain file;

updating the first file at the one client;

generating, update information based on updating the first file, wherein the update information comprises an update associated with the first file and an identifier of the one client;

transmitting, to the server, the generated update information, wherein the server extracts from the first file, parts related to the update information, wherein the extracting includes identifying relationships between parameters passed among the parts of the files or passed among the plurality of files stored at the server;

upon receipt of warning information including update information and including respective identifiers of a plurality of clients submitting updates from the server indicating that a second file, which is a copy of the certain file, at another client is an updated version of the file, wherein the warning information indicates that the first file is outdated relative to the second file, presenting a notification via a user interface of the one client that the warning information has been received, wherein the warning information is sent by the server responsive to the server judging, based on the stored update information and extracted parts, that the first file is outdated since the certain file has been copied and updated by the another client, wherein plurality of clients comprises the one client and the another client.

8. The method according to claim 7, further comprising:
judging whether or not the received first file is associated with the update information; and
only if the information the first file is judged as associated with the update information, making notification that the first file is associated with the update information.

9. The method according to claim 7, wherein the transmitting of the instruction, the receiving, the generating, and the transmitting of the generated update information are performed by at least one computer program when the at least one computer program is executed on the one client, wherein the at least one computer program is stored in a tangible, non-transitory storage medium.

10. A server that is connected to a plurality of clients so as to be capable of data communication with the clients, wherein said server is operable to collect and store a plurality of files, and copy a file and transmit the file copy to a first client, wherein the server comprises hardware operable to execute computer program instructions, the server further comprising:

a first receiving unit that receives update information, associated with the file, from a first client, wherein the update information comprises an update associated with the file and respective identifiers of each of a first set of clients along with their respective updates;

a unit for extracting, from the file, parts related to the received update information, wherein the extracting includes identifying relationships between parameters passed among the parts of the file or passed among the plurality of files stored at the server;

an update information storing unit that stores the received update information in a repository separate from the file, without updating the file at the server;

a copy judging unit that judges, based on the stored update information, whether the file has been copied, updated by one or more clients of the set of clients, and transmitted to a client other than the first client; and a second information transmitting unit that, responsive to the copy judging unit judging that the file has been copied and transmitted to the other client, transmits warning information to the other client to which the file has been transmitted, the warning information including update information and including the respective identifiers of the clients submitting updates and indicating that the file copies received by the first set of clients are outdated versions of the file.

11. The server according to claim 10, further comprising:
an information attaching unit that stores the update information in association with the file; and a file transmitting unit that transmits the file copy together with the update information stored in association with the file.

12. The server according to claim 10, further comprising a structure storing unit that stores information on structures of files to be updated, wherein an extracting unit extracts a file containing a part related to the update information, on the basis of the information on the structures of the files stored in the structure storing unit.

13. The server according to claim 12, wherein the information on the structures of the files contains information on parameter passing between the files.

14. The server according to 10, wherein the files are program files for program development.

15. The server according to claim 10, wherein each of the plurality of clients includes:
an instruction transmitting unit that transmits, to the server, an instruction to copy a certain file for update;
a file receiving unit that receives the file;
a generating unit that, upon update of the received file, generates update information on the update of the received file; and
a first information transmitting unit that transmits the generated update information to the server.

16. The server according to claim 15, further comprising:
an information attaching unit that stores the update information in association with the file; and
a file transmitting unit that transmits the file together with the update information stored in association with the file, wherein each of said plurality of clients further includes:
an information judging unit that judges whether or not the received file is associated with the update information; and
a notifying unit that, if the information judging unit judges that the file is associated with the update information, makes notification that the file is associated with the update information.

17. The server according to claim 15, wherein each of the plurality of clients further includes a warning notifying unit that, upon receipt of the warning information, makes notification that the warning information has been received.

18. The server according to claim 10, wherein the first receiving unit, the copy judging unit, and the second information transmitting units are each computer programs that are stored in a tangible, non-transitory storage medium, which perform functions when executed on hardware of the server.

19. A client, which is one of a plurality of clients communicatively linked to a server, wherein said server is operable to collect and store a plurality of files updated in some of the clients including said client, wherein the client comprises hardware operable to execute computer program instructions, the client comprising:

an instruction transmitting unit that transmits, to the server, an instruction to copy a certain file for update;
a file receiving unit that receives a first file, which is a copy of the certain file;
a file updating unit that updates the first file;
a generating unit that generates update information on the update of the received file copy, wherein the update information comprises an update associated with the first file and an identifier of the one client;
a first information transmitting unit that transmits the generated update information to the server, wherein the server extracts from the first file, parts related to the update information, wherein the extracting includes identifying relationships between parameters passed among the parts of the files or passed among the plurality of files stored at the server; and a warning notifying unit that receives warning information from the server indicating that a second file copy at another client is an updated version of the file, wherein the warning information includes respective identifiers of a plurality of clients submitting updates to the server, wherein the warning information indicates that the first file is outdated relative to the second file, wherein the warning notifying unit presents a notification via a user interface of the client that the warning information has been received, wherein the warning information is sent by the server responsive to the server judging, based on the stored update information and extracted parts, that the first file is outdated since the certain file has been copied and updated by the another client, wherein plurality of clients comprises the one client and the another client.

20. The client of claim 19, further comprising:

an information judging unit that judges whether or not the received file is associated with the update information; and a notifying unit that, if the information judging unit judges that the file is associated with the update information, makes notification that the file is associated with the update information.

21. The client of claim 19, wherein instruction transmitting unit, the file receiving unit, the generating unit, and the first information transmitting unit are each computer programs that are stored in a tangible, non-transitory storage medium, which perform functions when executed on hardware of the client.

22. The method of claim 1, further comprising extracting a file containing a part related to the received update information.

* * * * *